US008732346B2

(12) United States Patent
D'Amato et al.

(10) Patent No.: US 8,732,346 B2
(45) Date of Patent: May 20, 2014

(54) COORDINATION OF DIRECT I/O WITH A FILTER

(75) Inventors: Andrea D'Amato, Kirkland, WA (US); Vinod R. Shankar, Woodinville, WA (US); Alan Warwick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 238 days.

(21) Appl. No.: 12/971,997

(22) Filed: Dec. 17, 2010

(65) Prior Publication Data

US 2012/0159005 A1    Jun. 21, 2012

(51) Int. Cl.
*G06F 3/00* (2006.01)
*G06F 13/00* (2006.01)
*G06F 5/00* (2006.01)

(52) U.S. Cl.
USPC .................................. 710/14; 710/33; 710/36

(58) Field of Classification Search
None
See application file for complete search history.

(56) References Cited

U.S. PATENT DOCUMENTS

| | | | |
|---|---|---|---|
| 5,394,555 A | 2/1995 | Hunter | |
| 7,139,772 B2 | 11/2006 | Bamford | |
| 7,457,796 B2 | 11/2008 | Lashley | |
| 7,840,730 B2 * | 11/2010 | D'Amato et al. | 710/74 |
| 2005/0192932 A1 | 9/2005 | Kazar | |
| 2009/0327798 A1 | 12/2009 | D'Amato | |

OTHER PUBLICATIONS

Microsoft TechNet, "Event ID 5121—Cluster Shared Volume Functionality," Nov. 25, 2009, http://technet.microsoft.com/en-us/library/ee830327%28WS.10,printer%29.aspx.
Schulman, J., JSI Tip 6544. The Microsoft Windows Cluster Service (MSCS) clustering model, Apr. 7, 2003, http://www.windowsitpro.com/print/tips/jsi-tip-6544-the-microsoft-windows-cluster-service-mscs-clustering-model-.aspx.
Cluster Shared Volumes (CSV): Disk Ownership, Mar. 1, 2009, http://blogs.msdn.com/b/clustering/archive/2009/03/02/9453288.aspx.
Vredevoort, H., "How to Protect your MS Virtualized Environment with DPM2010 (Part 3)," Nov. 16, 2009, http://hyper-v.nu/blogs/hans/?p=148.
Barak et al., "Scalable Cluster Computing with MOSIX for LINUX," 1999, Institute of Computer Science the Hebrew University of Jerusalem.
Schmuck et al., "GPFS: A Shared-Disk File System for Large Computing Clusters," Proceedings of the Conference on File and Storage Technologies (FAST'02), Jan. 28-30, 2002, Monterey, CA, pp. 231-244.
Microsoft TechNet, "Cluster Shared Volumes," Nov. 25, 2009, http://technet.microsoft.com/en-us/library/ee830307%28WS.10,printer%29.aspx.

\* cited by examiner

*Primary Examiner* — Zachary K Huson
(74) *Attorney, Agent, or Firm* — Raghu Chinagudabha; Henry Gabryjelski; Micky Minhas

(57) ABSTRACT

Coordinating methods of I/O access to a shared data store. A method includes at a node, in a distributed system, performing one or more I/O operations on the shared data store using direct I/O access on a virtual data container. Direct I/O access includes performing I/O operations directly from the node to the shared data store including not having an owner node perform the I/O operation on the shared data store on the node's behalf. The owner node is a different node than the node doing the direct I/O operation. The owner node accesses the shared data store through a local data container. The method further includes determining that one or more subsequent I/O operations should be performed using redirected I/O access, where I/O operations are directed through a centralized node. The method further includes indicating to nodes in the distributed system to switch to redirected I/O access method.

20 Claims, 3 Drawing Sheets

COORDINATION OF DIRECT I/O WITH A FILTER

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

A cluster may be formed by networking independent computing systems, referred to as nodes, together as a unified computing resource. Nodes on a cluster may share a data volume. A volume is a single accessible storage area with a single file system, such as FAT32, NTFS, or some other file system. The volume can be a clustered shared volume available to different nodes on the cluster. Embodiments may be implemented where each node is capable of directly accessing a shared storage volume such that reads and writes can be performed directly by a node on a storage device. Performing reads and writes directly by a node on a storage device may be referred to herein as direct I/O.

Each node in a cluster may have a communication stack. Within any given stack may be filter drivers. Certain filter drivers access shared metadata on a shared storage volume. When running in a system where access to the volume is performed by direct I/O from multiple nodes at one time there is a problem with coordinating access to the metadata. In particular, each of the different filters may not be aware of what other filters are doing because the filters are implemented at different stacks on different nodes without any, or minimal, central coordination. Access to the metadata is needed for updating or self-healing. In the case of an encryption or other data transformation filter access to the volume via direct I/O may need to be coordinated with an encryption or data transformation process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method that may be practiced in a distributed computing system including a plurality of nodes. The method includes acts for coordinating methods of I/O access to a shared data store. The method includes at a node, in a distributed system, performing one or more I/O operations on the shared data store using direct I/O access on a virtual data container. Direct I/O access includes performing I/O operations directly from the node to the shared data store including not having an owner node perform the I/O operation on the shared data store on the node's behalf. The owner node is a different node than the node doing the direct I/O operation. The owner node accesses the shared data store using a local data container. The method further includes determining that one or more subsequent I/O operations should be performed using redirected I/O access, where I/O operations are directed through a centralized node. The method further includes indicating to nodes in the distributed system to switch to redirected I/O access method.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may include functionality for changing how I/O is performed by nodes in a cluster. In particular, embodiments may be able to request a switch from direct I/O where reads and writes are performed directly by a node on a storage device to redirected I/O, where reads and writes are routed through a coordinating node. This allows for the coordinating node to coordinate metadata reads and writes, coordinate encryption processes, coordinate data transformation process, etc.

Figure 1:
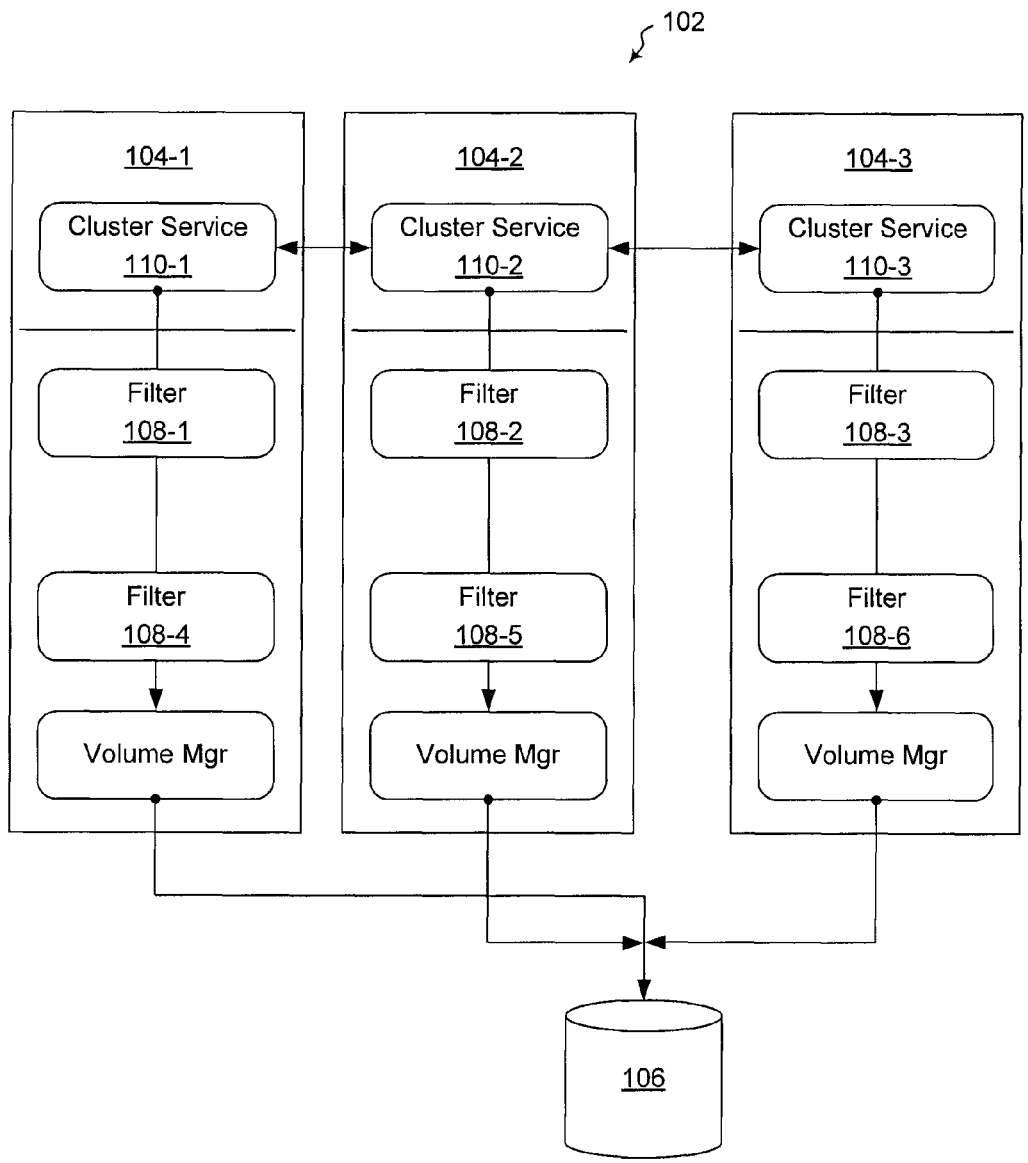
FIG. 1 illustrates an example cluster.

Referring now to FIG. 1, a cluster 102 is illustrated. In the particular cluster illustrated, there are three nodes, 104-1, 104-2, and 104-3 (however, the nodes may be referred to herein generically a 104). In the set of computer nodes that form the cluster 102 each node has direct I/O access to a shared volume 106. Each node (referred to herein generally as 104) may have one or more filters, referred to herein generally as 108, but illustrated specifically as 108-1, 108-2, 108-3, 108-4, 108-5, and 108-6. The filters 108 may have metadata and also may perform data transformation/encryption on the volume 106.

When a filter 108 on a node 104 determines that it needs exclusive access to metadata or the entire volume 106 it will raise an event to the cluster service, referred to herein generically as 110, but illustrated in a distributed fashion in FIG. 1 as 110-1, 110-2, and 110-3. In some embodiments, the cluster service 110 on each node 104 will then send a message to each filter 108 on each node 104 indicating a move from direct I/O mode to redirected I/O mode on the node 104 that needs exclusive access to the metadata. The cluster service 110 will move the volume into redirected mode and then send a notification to filters 108 on all nodes 104 that the volume 106 has moved into redirected mode and the redirected I/O node has exclusive access to the metadata.

Figure 2:
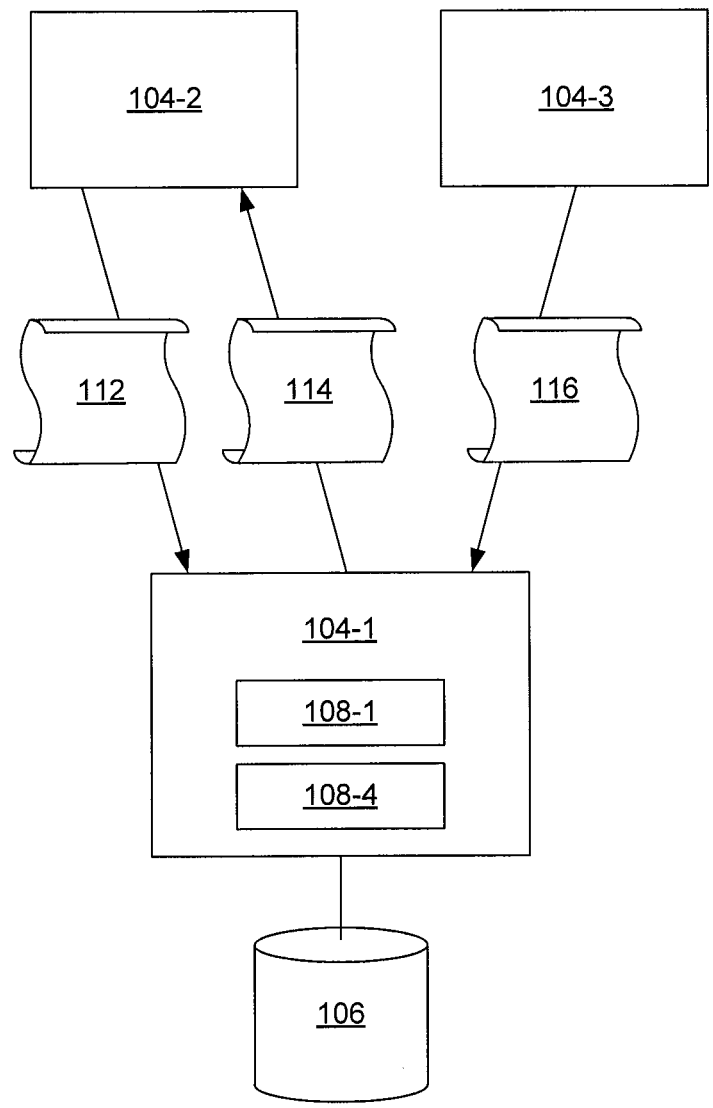
FIG. 2 illustrates an example cluster in redirected mode.
Figure 3:
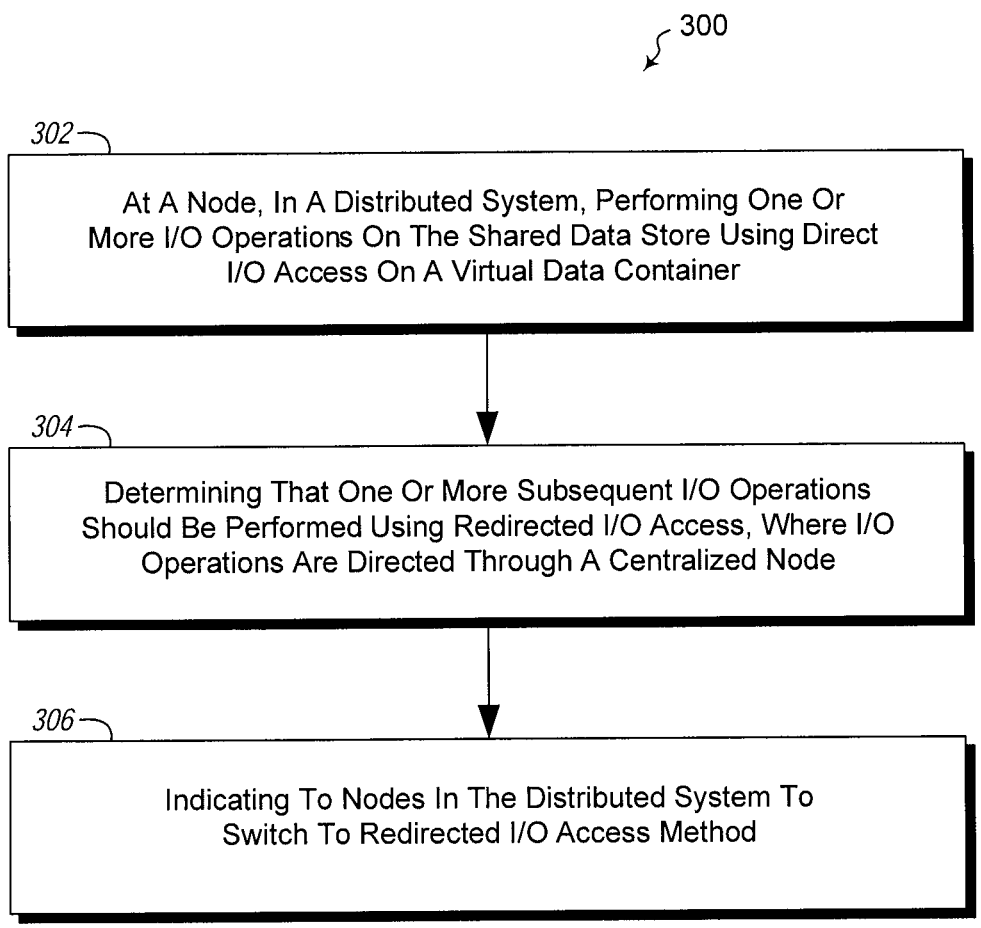
FIG. 3 illustrates a method of coordinating methods of I/O access to a shared data store.

Referring now to FIG. 2, an example of the cluster 102 in redirected mode is illustrated. In the example illustrated in FIG. 2, node 104-1 may be the redirected I/O node, and thus, all reads and writes on the volume 106 may be sent from another node (e.g. 104-2 or 104-3) to the redirected node 104-1, which then performs reads and/or writes on the volume 106 on behalf of the other nodes. Illustrating now a specific example, node 104-2 may wish to perform a read on the volume 106. In redirected I/O mode, the node 104-2 sends a read request 112 for the volume 106 to the redirected I/O node 104-1. The redirected node 104-1 performs a read on the volume 106 as specified in the read request 112. Redirected node 104-1 returns the results 114 of the read on the volume 106 to the node 104-2 which sent the read request 112.

In the example illustrated, the redirected node 104-1 may be an owner node. An owner node is a node that has the file system for the volume mounted to it.

FIG. 2 further illustrates an example of a redirected write. In this example, node 104-3 sends a write request 116 for the volume 106 to the redirected I/O node 104-1. The redirected node 104-1 performs a write on the volume 106 according to the write request 116.

In the example shown in FIG. 2, filters 108-1 and 108-4 exist in the communication stack of the node 104-1. Thus, node 104-1 becomes a central node with central filters 108 that can be used for coordination. Previously filters did not have any mechanism to coordinate access to metadata or to transform data on the volume while direct I/O access to the volume was in progress. In a previous version of CSV, an administrator would need to manually configure the filter and direct I/O state on all of the nodes to setup an environment where access to metadata could be performed safely.

Embodiments may have various aspects related to switching from or to a direct mode, where nodes can write to a volume directly, to or from a redirected mode, where nodes write to a volume through an owner node. In particular, as illustrated in FIG. 1, any node can veto the movement back from redirected mode to direct mode. In particular, if a node 104 is performing some operation that needs to be completed, the node 104 can veto the movement so as to enable the node to finish the operation. In some embodiments, the node 104 that vetoed the movement can then notify other nodes through the cluster service 110 that the movement can be requested once the node 104 is finished with an operation and will not veto, at least for some period of time, future request to move from redirected mode to direct mode.

In some embodiments, the cluster service 110 may poll the various filters 108 occasionally to ask if the filter if it is feasible to transition from redirected to direct I/O mode. For example, the cluster service 110 may send a periodic message to determine if nodes are able to transition from redirected to direct I/O mode. This may be performed when there is a need or desire for one node to transition modes.

In some embodiments nodes may include functionality for performing data flushing in conjunction with or as a result of moving from one mode to another, either direct mode to redirected mode or from redirected mode to direct mode. For example, a node may be performing a batched operation including operating performing a batch of I/O operations. If a request to switch from direct mode to redirected mode (or redirected mode to direct mode) comes during the processing of the batch, before the batch has completed, a node 104 may flush metadata for operations in the batch that have been completed. The batch can then be restarted at a subsequent time either in redirected mode, or when the node can switch back to direct mode.

In some embodiments nodes may include functionality for aborting transactions. A transaction is a set of operations in which all operations in the set must either be completed or rolled back such that none are completed with durable effects. Embodiments may include functionality for aborting transactions if a request to change from one mode to another, either direct mode to redirected mode or redirected mode to directed mode, is received.

Some embodiments include functionality for allowing an administrator or user to initiate a change between direct mode to redirected mode manually. In particular, a user interface may be used by an administrator or user at a computer system in the cluster. When moving from redirected mode to direct mode via an administrator action, the filters are able to veto this movement in the fashion described above.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

One embodiment is directed to a method 300 that may be practiced in a distributed computing system including a plurality of nodes. The method 300 includes acts for coordinating methods of I/O access to a shared data store. The method 300 includes at a node, in a distributed system, performing one or more I/O operations on the shared data store using direct I/O access on a virtual data container (act 302). Direct I/O access includes performing I/O operations directly from the node to the shared data store including not having an owner node perform the I/O operation on the shared data store on the node's behalf. The owner node is a different node than the node doing the direct I/O operation. The owner node accesses the shared data store using a local data container. For example, In FIG. 1, each of the nodes 104-1, 104-2 and 104-3 may be able to access the volume 106 directly. I/O operations do not need to be routed through a central node to the volume 106, but rather can be written directly by each of the nodes 104.

The method 300 further includes determining that one or more subsequent I/O operations should be performed using redirected I/O access, where I/O operations are directed through a centralized node (act 304). For example, a filter 108 in one of the nodes may determine that operations need to be routed through a central node. This may be done, for example, if there is a need for central coordination of I/O accesses on the volume 106. For example, a filter 108 on a node 104 may determine that it needs exclusive access to metadata or the entire volume 106. The central node can then perform I/O operations on a node's behalf.

The method 300 further includes indicating to nodes in the distributed system to switch to redirected I/O access method (act 306). For example, each of the nodes 104 shown in FIG. 1 may be informed of a desire to switch to a redirected mode where I/O accesses are routed to a central node. In one embodiment, this may be done by a filter raising an event to a cluster service 110.

The method 300 may further include performing subsequent I/O operations after indication using the redirected I/O access method. FIG. 2 illustrates an example of a switch to a redirected mode for I/O access.

The method 300 may further include receiving an indication from one of the nodes vetoing switching to a direct I/O access method. For example, in some embodiments, a filter in another node may indicate that it is not able to switch to the direct mode. Thus, the filter in the other node may veto and prevent a switch to the direct I/O mode.

As noted above, the method 300 may be practiced where determining that one or more subsequent I/O operations should be performed using a redirected I/O access may include a filter in a stack of a node indicating that the node desires to switch to a redirected I/O mode. For example, a filter may determine that it needs exclusive access to metadata or an entire volume 106.

The method 300 may further include as a result of indicating to nodes in the distributed system to switch to redirected I/O access method flushing cache values. For example, if a node receives an indication to switch modes, it may flush metadata cache or other cache that would become inapplicable in the new I/O mode. Similarly, the method 300 may further include as a result of indicating to nodes in the distributed system to switch to redirected I/O access method updating application metadata. Note that flushing a cache may be performed when switching from redirected I/O access methods to direct I/O access methods in other embodiments.

The method 300 may further include as a result of indicating to nodes in the distributed system to switch to redirected I/O access method aborting a transaction. For example, a node may be involved in a transaction where all operations in the transaction need to occur without error or none of the operations can be committed and made durable. Switching modes may cause locks on data to be lost or to be inapplicable. Thus, a request to switch modes may result in some embodiments in nodes aborting transactions that have not completed before the request to switch modes. Note that aborting a transaction may be performed when switching from redirected I/O access methods to direct I/O access methods in other embodiments.

The method 300 may further include as a result of indicating to nodes in the distributed system to switch to redirected I/O access method flushing a batch. For example, a batch of operations may be being performed. The batch may need to be completed using a given I/O mode. Thus, a request to switch modes may result in the batch being flushed such that operations remaining in the batch that have not been performed are flushed and not performed as part of the flushed batch. Note that flushing a batch may be performed when switching from redirected I/O access methods to direct I/O access methods in other embodiments.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing system comprising a plurality of nodes, a method of coordinating methods of I/O access to a shared data store, the method comprising:
   at a node, in a distributed system comprising a plurality of nodes, performing one or more I/O operations on the shared data store using direct I/O access mode on a virtual data container, wherein direct I/O access mode comprises performing I/O operations directly from the node to the shared data store including not having an owner node perform the I/O operation on the shared data store, wherein the owner node is a different node than the node doing the direct I/O operation, and wherein the owner node accesses the shared data store using a local data container;
   determining that one or more subsequent I/O operations should be performed using redirected I/O access mode, where I/O operations are directed through a centralized node;
   indicating to other nodes in the plurality of nodes in the distributed system to switch from direct I/O access mode to redirected I/O access mode, and
   where after, as a result of indicating to other nodes in the plurality of nodes in the distributed system to switch from direct I/O access mode to redirected I/O access mode, at least one node that was previously performing one or more I/O operations on the shared data store using direct I/O access mode on a virtual data container switches to using redirected I/O access mode, where I/O operations are directed through a centralized node different than the at least one node for performing I/O operations.

2. The method of claim 1 further comprising, performing subsequent I/O operations after indication using the redirected I/O access method.

3. The method of claim 1 further comprising, receiving an indication from one of the nodes vetoing switching back to a direct I/O access method from a redirected I/O access method.

4. The method of claim 1, wherein determining that one or more subsequent I/O operations should be performed using a redirected I/O access comprises a filter in a stack of a node indicating that the node desires to switch to a redirected I/O mode.

5. The method of claim 1 further comprising, as a result of indicating to nodes in the distributed system to switch to redirected I/O access method flushing cache values.

6. The method of claim 1 further comprising, as a result of indicating to nodes in the distributed system to switch to redirected I/O access method updating application metadata.

7. The method of claim 1 further comprising, as a result of indicating to nodes in the distributed system to switch to redirected I/O access method aborting a transaction.

8. The method of claim 1 further comprising, as a result of indicating to nodes in the distributed system to switch to redirected I/O access method flushing a batch.

9. A hardware computer readable storage medium comprising computer executable instructions that when executed by one or more processors causes the following to be performed:
   at a node, in a distributed system comprising a plurality of nodes, performing one or more I/O operations on the shared data store using direct I/O access mode on a virtual data container, wherein direct I/O access mode comprises performing I/O operations directly from the node to the shared data store including not having an owner node perform the I/O operation on the shared data store, wherein the owner node is a different node than the node doing the direct I/O operation, and wherein the owner node accesses the shared data store using a local data container;
   determining that one or more subsequent I/O operations should be performed using redirected I/O access mode, where I/O operations are directed through a centralized node; and
   indicating to other nodes in the plurality of nodes in the distributed system to switch from direct I/O access mode to redirected I/O access mode, and
   where after, as a result of indicating to other nodes in the plurality of nodes in the distributed system to switch from direct I/O access mode to redirected I/O access mode, at least one node that was previously performing one or more I/O operations on the shared data store using direct I/O access mode on a virtual data container switches to using redirected I/O access mode, where I/O operations are directed through a centralized node different than the at least one node for performing I/O operations.

10. The computer readable medium of claim 9 further comprising, performing subsequent I/O operations after indication using the redirected I/O access method.

11. The computer readable medium of claim 9 further comprising, receiving an indication from one of the nodes vetoing switching back to a direct I/O access method from a redirected I/O access method.

12. The computer readable medium of claim 9, wherein determining that one or more subsequent I/O operations should be performed using a redirected I/O access comprises a filter in a stack of a node indicating that the node desires to switch to a redirected I/O mode.

13. The computer readable medium of claim 9 further comprising, as a result of indicating to nodes in the distributed system to switch to redirected I/O access method flushing cache values.

14. The computer readable medium of claim 9 further comprising, as a result of indicating to nodes in the distributed system to switch to redirected I/O access method updating application metadata.

15. The computer readable medium of claim 9 further comprising, as a result of indicating to nodes in the distributed system to switch to redirected I/O access method aborting a transaction.

16. The computer readable medium of claim 9 further comprising, as a result of indicating to nodes in the distributed system to switch to redirected I/O access method flushing a batch.

17. In a computing environment, a computing system for coordinating methods of I/O access to a shared data store, the computing system comprising:
   one or more processors;

one or more computer readable media coupled to the one or more processors, the one or more computer readable comprising computer executable instructions that when executed by a processor cause one or more of the processors to perform the following:
- at a node, in a distributed system comprising a plurality of nodes, performing one or more I/O operations on the shared data store using direct I/O access mode on a virtual data container, wherein direct I/O mode access comprises performing I/O operations directly from the node to the shared data store including not having an owner node perform the I/O operation on the shared data store, wherein the owner node is a different node than the node doing the direct I/O operation, and wherein the owner node accesses the shared data store using a local data container;
- determining that one or more subsequent I/O operations should be performed using redirected I/O access mode, where I/O operations are directed through a centralized node owner node having the shared data store mounted to it and not mounted to other nodes in the computing environment; and
- indicating to other nodes in the plurality of nodes in the distributed system to switch from direct I/O access mode to redirected I/O access mode to route I/O accesses to the owner node which then performs the I/O accesses on a node's behalf, and
- where after, as a result of indicating to other nodes in the plurality of nodes in the distributed system to switch from direct I/O access mode to redirected I/O access mode, at least one node that was previously performing one or more I/O operations on the shared data store using direct I/O access mode on a virtual data container switches to using redirected I/O access mode, where I/O operations are directed through a centralized node different than the at least one node for performing I/O operations.

18. The computer system of claim 17 further comprising, performing subsequent I/O operations after indication using the redirected I/O access method.

19. The computer system of claim 17 further comprising, receiving an indication from one of the nodes vetoing switching back to a direct I/O access method from a redirected I/O access method.

20. The computer system of claim 17, wherein determining that one or more subsequent I/O operations should be performed using a redirected I/O access comprises a filter in a stack of a node indicating that the node desires to switch to a redirected I/O mode.

\* \* \* \* \*